(12) United States Patent
Christensen et al.

(10) Patent No.: US 10,373,264 B1
(45) Date of Patent: *Aug. 6, 2019

(54) VEHICLE IMAGE AND SOUND DATA GATHERING FOR INSURANCE RATING PURPOSES

(71) Applicant: STATE FARM MUTUAL AUTOMOBILE INSURANCE COMPANY, Bloomington, IL (US)

(72) Inventors: Scott T. Christensen, Salem, OR (US); Gregory Hayward, Bloomington, IL (US); Christopher E. Gay, Dallas, TX (US); Steven Cielocha, Bloomington, IL (US); Todd Binion, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/639,016

(22) Filed: Jun. 30, 2017

Related U.S. Application Data

(63) Continuation of application No. 14/203,344, filed on Mar. 10, 2014, now Pat. No. 9,734,537.

(Continued)

(51) Int. Cl.
*G06Q 40/08* (2012.01)
*G07C 5/00* (2006.01)
(Continued)

(52) U.S. Cl.
CPC .............. *G06Q 40/08* (2013.01); *B60Q 1/00* (2013.01); *G06Q 30/0208* (2013.01); *G06Q 40/00* (2013.01); *G07C 5/008* (2013.01)

(58) Field of Classification Search
CPC ...... G06Q 40/08; G06Q 10/20; G07C 5/0808; G07C 5/006; G07C 5/0833; H04N 21/42203; H04W 4/046
See application file for complete search history.

(56) References Cited

U.S. PATENT DOCUMENTS 4,303,904 A  12/1981  Chasek
5,310,999 A  5/1994  Claus et al.
(Continued)

OTHER PUBLICATIONS

Classic Car Feature Article "Insurance by the Mile", Article #102504, by Jack Nerad for Driving Today, downloaded from the Internet at: <http://www.antiquecar.com/feature-insurance_by_the_mile.php> (Oct. 25, 2004).

(Continued)

*Primary Examiner* — Mohammad Z Shaikh
(74) *Attorney, Agent, or Firm* — Marshall, Gerstein & Borun LLP; Randall G. Rueth

(57) ABSTRACT

A method and computer system provides vehicle insurance underwriting and ratings to a policy holder. The method and system receives captured sensor data associated with a vehicle from the policy holder. For example, the captured sensor data may include vehicle image and sound data. The method and system may compare the received data to baseline data to determine an operating condition of the vehicle. Based at least in part on the determined operating condition of the vehicle, the method and system may identify a risk of loss for the vehicle. The method and system may then determine an insurance premium for the vehicle based at least in part on the identified risk of loss, and provide the determined insurance premium to the policy holder. In some embodiments, the sensor data is image and sound data captured by a user's mobile phone.

20 Claims, 4 Drawing Sheets

Related U.S. Application Data

(60) Provisional application No. 61/775,652, filed on Mar. 10, 2013.

(51) Int. Cl.
  *B60Q 1/00* (2006.01)
  *G06Q 30/02* (2012.01)
  *G06Q 40/00* (2012.01)

(56) References Cited

U.S. PATENT DOCUMENTS

| | | | |
|---|---|---|---|
| 5,319,611 A | 6/1994 | Korba | |
| 5,499,182 A | 3/1996 | Ousborne | |
| 5,550,551 A | 8/1996 | Alesio | |
| 5,797,134 A | 8/1998 | McMillan et al. | |
| 5,819,230 A | 10/1998 | Christie et al. | |
| 5,916,287 A | 6/1999 | Arjomand et al. | |
| 6,064,970 A | 5/2000 | McMillan et al. | |
| 6,313,791 B1 | 11/2001 | Klanke | |
| 6,408,232 B1 | 6/2002 | Cannon et al. | |
| 6,434,510 B1 | 8/2002 | Callaghan | |
| 6,718,235 B1 | 4/2004 | Borugian | |
| 6,741,168 B2 | 5/2004 | Webb et al. | |
| 6,831,993 B2 | 12/2004 | Lemelson et al. | |
| 6,832,141 B2 | 12/2004 | Skeen et al. | |
| 6,856,933 B1 | 2/2005 | Callaghan | |
| 6,868,386 B1 | 3/2005 | Henderson et al. | |
| 7,194,347 B2* | 3/2007 | Harumoto | B60R 21/0132 340/436 |
| 7,343,306 B1 | 3/2008 | Bates et al. | |
| 7,343,310 B1 | 3/2008 | Stender | |
| 7,571,128 B1 | 8/2009 | Brown | |
| 7,650,210 B2* | 1/2010 | Breed | B60W 50/0205 701/29.1 |
| 7,659,827 B2 | 2/2010 | Gunderson et al. | |
| 7,724,145 B2 | 5/2010 | Batra et al. | |
| 7,725,348 B1 | 5/2010 | Allen et al. | |
| 7,812,712 B2 | 10/2010 | White et al. | |
| 7,860,764 B1 | 12/2010 | Alexander et al. | |
| 7,865,378 B2 | 1/2011 | Gay | |
| 7,870,010 B2 | 1/2011 | Joao | |
| 7,890,355 B2 | 2/2011 | Gay et al. | |
| 7,930,098 B2 | 4/2011 | Huang et al. | |
| 7,937,278 B1 | 5/2011 | Cripe et al. | |
| 7,991,629 B2 | 8/2011 | Gay et al. | |
| 8,027,853 B1 | 9/2011 | Kazenas | |
| 8,086,523 B1 | 12/2011 | Palmer | |
| 8,090,598 B2 | 1/2012 | Bauer et al. | |
| 8,140,358 B1* | 3/2012 | Ling | G06Q 40/08 705/4 |
| 8,280,752 B1 | 10/2012 | Cripe et al. | |
| 8,311,858 B2* | 11/2012 | Everett | G06Q 40/08 705/4 |
| 8,332,242 B1 | 12/2012 | Medina, III | |
| 8,352,118 B1* | 1/2013 | Mittelsteadt | G07C 5/008 340/438 |
| 8,359,213 B2 | 1/2013 | Berg et al. | |
| 8,359,259 B2 | 1/2013 | Berg et al. | |
| 8,407,139 B1 | 3/2013 | Palmer | |
| 8,423,239 B2 | 4/2013 | Blumer et al. | |
| 8,489,433 B2 | 7/2013 | Altieri et al. | |
| 8,508,353 B2 | 8/2013 | Cook et al. | |
| 8,527,146 B1 | 9/2013 | Jackson et al. | |
| 8,538,785 B2 | 9/2013 | Coleman et al. | |
| 8,538,789 B1 | 9/2013 | Blank et al. | |
| 8,566,126 B1 | 10/2013 | Hopkins, III | |
| 8,569,141 B2 | 10/2013 | Huang et al. | |
| 8,605,948 B2* | 12/2013 | Mathony | B60W 50/14 382/104 |
| 8,606,512 B1 | 12/2013 | Bogovich et al. | |
| 8,606,514 B2 | 12/2013 | Rowley et al. | |
| 8,612,139 B2 | 12/2013 | Wang et al. | |
| 8,630,768 B2 | 1/2014 | McClellan et al. | |
| 8,635,091 B2 | 1/2014 | Amigo et al. | |
| 8,655,544 B2 | 2/2014 | Fletcher et al. | |
| 8,682,699 B2 | 3/2014 | Collins et al. | |
| 8,686,844 B1 | 4/2014 | Wine | |
| 8,725,408 B2 | 5/2014 | Hochkirchen et al. | |
| 8,731,768 B2 | 5/2014 | Fernandes et al. | |
| 8,799,035 B2 | 8/2014 | Coleman et al. | |
| 8,799,036 B1 | 8/2014 | Christensen et al. | |
| 8,812,330 B1 | 8/2014 | Cripe et al. | |
| 8,874,477 B2 | 10/2014 | Hoffberg | |
| 8,892,451 B2 | 11/2014 | Everett et al. | |
| 8,935,036 B1 | 1/2015 | Christensen et al. | |
| 8,983,677 B2* | 3/2015 | Wright | H04B 11/00 381/56 |
| 8,989,914 B1 | 3/2015 | Nemat-Nasser et al. | |
| 9,008,956 B2 | 4/2015 | Hyde et al. | |
| 9,031,545 B2 | 5/2015 | Srey et al. | |
| 9,053,469 B1 | 6/2015 | Bohanek et al. | |
| 9,098,367 B2* | 8/2015 | Ricci | G06F 8/61 |
| 9,105,066 B2 | 8/2015 | Gay et al. | |
| 9,141,582 B1 | 9/2015 | Brinkmann et al. | |
| 9,141,995 B1 | 9/2015 | Brinkmann et al. | |
| 9,141,996 B2 | 9/2015 | Christensen et al. | |
| 9,164,957 B2* | 10/2015 | Hassib | G06Q 10/00 |
| 9,183,441 B2 | 11/2015 | Blumer et al. | |
| 9,208,525 B2 | 12/2015 | Hayward et al. | |
| 9,221,428 B2 | 12/2015 | Kote et al. | |
| 9,256,991 B2* | 2/2016 | Crawford | G06Q 40/08 |
| 9,377,528 B2* | 6/2016 | Birken | G01B 11/2513 |
| 9,418,383 B1 | 8/2016 | Hayward et al. | |
| 9,454,786 B1 | 9/2016 | Srey et al. | |
| 9,734,537 B2* | 8/2017 | Christensen | G07C 5/00 |
| 2001/0044733 A1 | 11/2001 | Lee et al. | |
| 2002/0026394 A1 | 2/2002 | Savage et al. | |
| 2002/0111725 A1 | 8/2002 | Burge | |
| 2002/0128985 A1* | 9/2002 | Greenwald | G06Q 30/02 705/400 |
| 2002/0198843 A1 | 12/2002 | Wang et al. | |
| 2003/0112133 A1 | 6/2003 | Webb et al. | |
| 2003/0191581 A1 | 10/2003 | Ukai et al. | |
| 2003/0209893 A1 | 11/2003 | Breed et al. | |
| 2003/0229528 A1* | 12/2003 | Nitao | G06Q 10/10 705/325 |
| 2003/0236686 A1 | 12/2003 | Matsumoto et al. | |
| 2004/0039611 A1* | 2/2004 | Hong | G06Q 40/08 705/4 |
| 2004/0102984 A1 | 5/2004 | Wahlbin et al. | |
| 2004/0117358 A1 | 6/2004 | von Kaenel et al. | |
| 2004/0153362 A1 | 8/2004 | Bauer et al. | |
| 2004/0193347 A1* | 9/2004 | Harumoto | B60R 21/0132 701/45 |
| 2004/0225557 A1 | 11/2004 | Phelan et al. | |
| 2005/0024185 A1 | 2/2005 | Chuey | |
| 2005/0171663 A1* | 8/2005 | Mittelsteadt | G06Q 40/08 701/32.6 |
| 2005/0267784 A1 | 12/2005 | Slen et al. | |
| 2005/0283388 A1 | 12/2005 | Eberwine et al. | |
| 2006/0049925 A1 | 3/2006 | Hara et al. | |
| 2006/0053038 A1 | 3/2006 | Warren et al. | |
| 2006/0059020 A1 | 3/2006 | Davidson | |
| 2006/0075120 A1 | 4/2006 | Smit | |
| 2006/0079280 A1 | 4/2006 | LaPerch | |
| 2006/0095301 A1 | 5/2006 | Gay | |
| 2006/0114531 A1* | 6/2006 | Webb | G01N 21/8806 359/15 |
| 2006/0206415 A1 | 9/2006 | Ross | |
| 2006/0247852 A1 | 11/2006 | Kortge et al. | |
| 2007/0005404 A1 | 1/2007 | Raz et al. | |
| 2007/0061173 A1 | 3/2007 | Gay | |
| 2007/0106539 A1 | 5/2007 | Gay | |
| 2007/0124045 A1 | 5/2007 | Ayoub et al. | |
| 2007/0156312 A1* | 7/2007 | Breed | B60C 23/007 701/31.4 |
| 2007/0156468 A1 | 7/2007 | Gay et al. | |
| 2007/0256499 A1* | 11/2007 | Pelecanos | G01H 1/00 73/579 |
| 2007/0268158 A1 | 11/2007 | Gunderson et al. | |
| 2007/0282638 A1 | 12/2007 | Surovy | |
| 2007/0288270 A1 | 12/2007 | Gay et al. | |

(56) References Cited

U.S. PATENT DOCUMENTS

| | | | |
|---|---|---|---|
| 2007/0299700 A1 | 12/2007 | Gay et al. | |
| 2008/0018466 A1 | 1/2008 | Batra et al. | |
| 2008/0027761 A1 | 1/2008 | Bracha | |
| 2008/0051996 A1 | 2/2008 | Dunning et al. | |
| 2008/0059019 A1* | 3/2008 | Delia | G07C 5/085 |
| | | | 701/33.4 |
| 2008/0065427 A1 | 3/2008 | Helitzer et al. | |
| 2008/0174451 A1 | 7/2008 | Harrington et al. | |
| 2008/0215376 A1 | 9/2008 | Engelman | |
| 2008/0243558 A1 | 10/2008 | Gupte | |
| 2008/0255888 A1 | 10/2008 | Berkobin et al. | |
| 2009/0002147 A1 | 1/2009 | Bloebaum et al. | |
| 2009/0024419 A1 | 1/2009 | McClellan et al. | |
| 2009/0024458 A1* | 1/2009 | Palmer | G07B 15/02 |
| | | | 705/13 |
| 2009/0043441 A1* | 2/2009 | Breed | G06K 7/10178 |
| | | | 701/31.9 |
| 2009/0094066 A1 | 4/2009 | Freudman et al. | |
| 2009/0150023 A1 | 6/2009 | Grau et al. | |
| 2009/0210257 A1 | 8/2009 | Chalfant et al. | |
| 2010/0030568 A1 | 2/2010 | Daman | |
| 2010/0066513 A1 | 3/2010 | Bauchot et al. | |
| 2010/0088123 A1 | 4/2010 | McCall et al. | |
| 2010/0131302 A1* | 5/2010 | Collopy | G06Q 30/0224 |
| | | | 705/4 |
| 2010/0131304 A1 | 5/2010 | Collopy et al. | |
| 2010/0138244 A1 | 6/2010 | Basir | |
| 2010/0185534 A1 | 7/2010 | Satyavolu et al. | |
| 2010/0223080 A1 | 9/2010 | Basir et al. | |
| 2010/0238009 A1 | 9/2010 | Cook et al. | |
| 2011/0022421 A1 | 1/2011 | Brown et al. | |
| 2011/0040579 A1 | 2/2011 | Havens | |
| 2011/0106370 A1 | 5/2011 | Duddle et al. | |
| 2011/0125363 A1 | 5/2011 | Blumer et al. | |
| 2011/0137685 A1 | 6/2011 | Tracy et al. | |
| 2011/0153367 A1 | 6/2011 | Amigo et al. | |
| 2011/0161117 A1 | 6/2011 | Busque et al. | |
| 2011/0161118 A1 | 6/2011 | Borden et al. | |
| 2011/0200052 A1 | 8/2011 | Mungo et al. | |
| 2011/0213628 A1 | 9/2011 | Peak et al. | |
| 2011/0267186 A1 | 11/2011 | Rao et al. | |
| 2011/0304446 A1 | 12/2011 | Basson et al. | |
| 2011/0307188 A1 | 12/2011 | Peng et al. | |
| 2012/0004933 A1 | 1/2012 | Foladare et al. | |
| 2012/0021386 A1 | 1/2012 | Anderson et al. | |
| 2012/0029945 A1 | 2/2012 | Altieri et al. | |
| 2012/0065834 A1 | 3/2012 | Senart et al. | |
| 2012/0069979 A1 | 3/2012 | Henry, Jr. et al. | |
| 2012/0072243 A1 | 3/2012 | Collins et al. | |
| 2012/0072244 A1 | 3/2012 | Collins et al. | |
| 2012/0089423 A1 | 4/2012 | Tamir et al. | |
| 2012/0089701 A1 | 4/2012 | Goel | |
| 2012/0101855 A1 | 4/2012 | Collins et al. | |
| 2012/0109418 A1 | 5/2012 | Lorber | |
| 2012/0109692 A1 | 5/2012 | Collins et al. | |
| 2012/0130752 A1 | 5/2012 | Moskal | |
| 2012/0158436 A1 | 6/2012 | Bauer et al. | |
| 2012/0190386 A1 | 7/2012 | Anderson | |
| 2012/0197669 A1 | 8/2012 | Kote et al. | |
| 2012/0209632 A1 | 8/2012 | Kaminski et al. | |
| 2012/0209634 A1 | 8/2012 | Ling et al. | |
| 2012/0214472 A1 | 8/2012 | Tadayon et al. | |
| 2012/0226421 A1 | 9/2012 | Kote et al. | |
| 2012/0259665 A1 | 10/2012 | Pandhi et al. | |
| 2012/0271661 A1 | 10/2012 | Reynolds et al. | |
| 2012/0283893 A1 | 11/2012 | Lee et al. | |
| 2012/0323531 A1* | 12/2012 | Pascu | G01M 13/028 |
| | | | 702/184 |
| 2012/0323772 A1 | 12/2012 | Michael | |
| 2012/0330499 A1* | 12/2012 | Scheid | G01N 29/14 |
| | | | 701/33.4 |
| 2013/0006675 A1 | 1/2013 | Bowne et al. | |
| 2013/0013347 A1 | 1/2013 | Ling et al. | |
| 2013/0013348 A1 | 1/2013 | Ling et al. | |
| 2013/0018677 A1 | 1/2013 | Chevrette | |
| 2013/0035964 A1 | 2/2013 | Roscoe et al. | |
| 2013/0041521 A1 | 2/2013 | Basir et al. | |
| 2013/0041621 A1 | 2/2013 | Smith et al. | |
| 2013/0046510 A1 | 2/2013 | Bowne et al. | |
| 2013/0046559 A1 | 2/2013 | Coleman et al. | |
| 2013/0046562 A1 | 2/2013 | Taylor et al. | |
| 2013/0046646 A1 | 2/2013 | Malan | |
| 2013/0084847 A1 | 4/2013 | Tibbitts et al. | |
| 2013/0110310 A1 | 5/2013 | Young | |
| 2013/0117050 A1 | 5/2013 | Berg et al. | |
| 2013/0144474 A1* | 6/2013 | Ricci | H04W 4/90 |
| | | | 701/22 |
| 2013/0144657 A1 | 6/2013 | Ricci | |
| 2013/0151064 A1 | 6/2013 | Becker et al. | |
| 2013/0161110 A1 | 6/2013 | Furst | |
| 2013/0166098 A1 | 6/2013 | Lavie et al. | |
| 2013/0166326 A1 | 6/2013 | Lavie et al. | |
| 2013/0188794 A1* | 7/2013 | Kawamata | G01S 3/803 |
| | | | 381/56 |
| 2013/0189660 A1 | 7/2013 | Mangum et al. | |
| 2013/0211662 A1* | 8/2013 | Blumer | G06F 17/00 |
| | | | 701/31.4 |
| 2013/0226624 A1 | 8/2013 | Blessman et al. | |
| 2013/0244210 A1* | 9/2013 | Nath | G07C 5/008 |
| | | | 434/65 |
| 2013/0262530 A1 | 10/2013 | Collins et al. | |
| 2013/0289819 A1 | 10/2013 | Hassib et al. | |
| 2013/0297387 A1 | 11/2013 | Michael | |
| 2013/0304276 A1 | 11/2013 | Flies | |
| 2013/0304515 A1 | 11/2013 | Gryan et al. | |
| 2013/0317693 A1 | 11/2013 | Jefferies et al. | |
| 2013/0325519 A1 | 12/2013 | Tracy et al. | |
| 2013/0344856 A1 | 12/2013 | Silver et al. | |
| 2013/0345896 A1 | 12/2013 | Blumer et al. | |
| 2014/0012604 A1 | 1/2014 | Allen, Jr. | |
| 2014/0019167 A1 | 1/2014 | Cheng et al. | |
| 2014/0019170 A1 | 1/2014 | Coleman et al. | |
| 2014/0025401 A1 | 1/2014 | Hagelstein et al. | |
| 2014/0046701 A1 | 2/2014 | Steinberg et al. | |
| 2014/0052479 A1 | 2/2014 | Kawamura | |
| 2014/0058761 A1 | 2/2014 | Freiberger et al. | |
| 2014/0074345 A1* | 3/2014 | Gabay | G07C 5/008 |
| | | | 701/31.4 |
| 2014/0074402 A1 | 3/2014 | Hassib et al. | |
| 2014/0086419 A1* | 3/2014 | Rana | G07C 5/008 |
| | | | 381/56 |
| 2014/0089101 A1 | 3/2014 | Meller | |
| 2014/0108058 A1 | 4/2014 | Bourne et al. | |
| 2014/0111647 A1 | 4/2014 | Atsmon et al. | |
| 2014/0114696 A1 | 4/2014 | Amigo et al. | |
| 2014/0180723 A1 | 6/2014 | Cote et al. | |
| 2014/0180727 A1 | 6/2014 | Freiberger et al. | |
| 2014/0257865 A1 | 9/2014 | Gay et al. | |
| 2014/0257866 A1 | 9/2014 | Gay et al. | |
| 2014/0257867 A1 | 9/2014 | Gay et al. | |
| 2014/0257868 A1 | 9/2014 | Hayward et al. | |
| 2014/0257869 A1 | 9/2014 | Binion et al. | |
| 2014/0257870 A1 | 9/2014 | Cielocha et al. | |
| 2014/0257871 A1 | 9/2014 | Christensen et al. | |
| 2014/0257872 A1 | 9/2014 | Christensen et al. | |
| 2014/0257873 A1 | 9/2014 | Hayward et al. | |
| 2014/0257874 A1 | 9/2014 | Hayward et al. | |
| 2014/0278574 A1 | 9/2014 | Barber | |
| 2014/0304011 A1 | 10/2014 | Yager et al. | |
| 2014/0310028 A1 | 10/2014 | Christensen et al. | |
| 2016/0086393 A1 | 3/2016 | Collins et al. | |
| 2016/0225098 A1 | 8/2016 | Helitzer et al. | |

OTHER PUBLICATIONS

Mihailescu, An assessment Charter airline benefits for Port Elizabeth and the Eastern Cape, Chinese Business Review, pp. 34-45 (Feb. 2010).
U.S. Appl. No. 14/202,660, Final Office Action, dated Jul. 10, 2015.
U.S. Appl. No. 14/202,660, Final Office Action, dated Sep. 4, 2014.
U.S. Appl. No. 14/202,660, Nonfinal Office Action, dated Feb. 3, 2015.

(56) References Cited

OTHER PUBLICATIONS

U.S. Appl. No. 14/202,660, Nonfinal Office Action, dated Jul. 28, 2017.
U.S. Appl. No. 14/202,660, Nonfinal Office Action, dated May 14, 2014.
U.S. Appl. No. 14/202,812, Final Office Action, dated Jul. 23, 2015.
U.S. Appl. No. 14/202,812, Final Office Action, dated Sep. 5, 2014.
U.S. Appl. No. 14/202,812, Nonfinal Office Action, dated Feb. 23, 2015.
U.S. Appl. No. 14/202,812, Nonfinal Office Action, dated Jun. 30, 2017.
U.S. Appl. No. 14/202,812, Nonfinal Office Action, dated May 23, 2014.
U.S. Appl. No. 14/202,997, Notice of Allowance, dated May 29, 2014.
U.S. Appl. No. 14/203,015, Notice of Allowance, dated Mar. 31, 2015.
U.S. Appl. No. 14/203,015, Office Action, dated May 22, 2014.
U.S. Appl. No. 14/203,015, Office Action, dated Oct. 29, 2014.
U.S. Appl. No. 14/203,115, Final Office Action, dated Dec. 12, 2016.
U.S. Appl. No. 14/203,115, Final Office Action, dated Mar. 12, 2015.
U.S. Appl. No. 14/203,115, Final Office Action, dated Nov. 5, 2015.
U.S. Appl. No. 14/203,115, Nonfinal Office Action, dated Jun. 11, 2014.
U.S. Appl. No. 14/203,115, Nonfinal Office Action, dated Jun. 15, 2017.
U.S. Appl. No. 14/203,115, Nonfinal Office Action, dated Jun. 28, 2016.
U.S. Appl. No. 14/203,115, Nonfinal Office Action, dated Jun. 30, 2015.
U.S. Appl. No. 14/203,115, Nonfinal Office Action, dated Oct. 9, 2014.
U.S. Appl. No. 14/203,143, Examiner's Answer to Appeal Brief, dated Nov. 17, 2016.
U.S. Appl. No. 14/203,143, Final Office Action, dated Jan. 7, 2016.
U.S. Appl. No. 14/203,143, Final Office Action, dated May 18, 2015.
U.S. Appl. No. 14/203,143, Final Office Action, dated Sep. 23, 2014.
U.S. Appl. No. 14/203,143, Nonfinal Office Action, dated Jan. 14, 2015.
U.S. Appl. No. 14/203,143, Nonfinal Office Action, dated Jul. 29, 2015.
U.S. Appl. No. 14/203,143, Nonfinal Office Action, dated Jun. 3, 2014.
U.S. Appl. No. 14/203,210, Final Office Action, dated Aug. 11, 2015.
U.S. Appl. No. 14/203,210, Final Office Action, dated Aug. 28, 2017.
U.S. Appl. No. 14/203,210, Final Office Action, dated Nov. 28, 2014.
U.S. Appl. No. 14/203,210, Final Office Action, dated Oct. 13, 2016.
U.S. Appl. No. 14/203,210, Nonfinal Office Action, dated Apr. 22, 2014.
U.S. Appl. No. 14/203,210, Nonfinal Office Action, dated Aug. 27, 2014.
U.S. Appl. No. 14/203,210, Nonfinal Office Action, dated Jun. 29, 2017.
U.S. Appl. No. 14/203,210, Nonfinal Office Action, dated Mar. 19, 2015.
U.S. Appl. No. 14/203,210, Nonfinal Office Action, dated May 26, 2016.
U.S. Appl. No. 14/203,338, Final Office Action, dated Oct. 6, 2014.
U.S. Appl. No. 14/203,338, Notice of Allowance, dated May 20, 2015.
U.S. Appl. No. 14/203,338, Office Action, dated Feb. 3, 2015.
U.S. Appl. No. 14/203,338, Office Action, dated Jun. 2, 2014.
U.S. Appl. No. 14/203,344, Final Office Action, dated Dec. 22, 2015.
U.S. Appl. No. 14/203,344, Final Office Action, dated Mar. 18, 2015.
U.S. Appl. No. 14/203,344, Nonfinal Office Action, dated Jun. 30, 2015.
U.S. Appl. No. 14/203,344, Nonfinal Office Action, dated Jun. 6, 2014.
U.S. Appl. No. 14/203,344, Nonfinal Office Action, dated Nov. 24, 2014.
U.S. Appl. No. 14/203,344, Nonfinal Office Action, dated Oct. 6, 2016.
U.S. Appl. No. 14/203,344, Notice of Allowance, dated Apr. 7, 2017.
U.S. Appl. No. 14/203,349, Final Office Action, dated Mar. 17, 2015.
U.S. Appl. No. 14/203,349, Final Office Action, dated Dec. 3, 2015.
U.S. Appl. No. 14/203,349, Nonfinal Office Action, dated Feb. 10, 2017.
U.S. Appl. No. 14/203,349, Nonfinal Office Action, dated Jun. 15, 2015.
U.S. Appl. No. 14/203,349, Nonfinal Office Action, dated May 20, 2014.
U.S. Appl. No. 14/203,349, Nonfinal Office Action, dated Oct. 23, 2014.
U.S. Appl. No. 14/203,349, Notice of Allowance, dated Jul. 26, 2017.
U.S. Appl. No. 14/203,356, Final Office Action, dated Apr. 17, 2015.
U.S. Appl. No. 14/203,356, Nonfinal Office Action, dated Jun. 13, 2014.
U.S. Appl. No. 14/203,356, Nonfinal Office Action, dated Sep. 24, 2014.
U.S. Appl. No. 14/203,356, Notice of Allowance, dated Aug. 6, 2015.
U.S. Appl. No. 14/314,822, Final Office Action, dated Apr. 20, 2017.
U.S. Appl. No. 14/314,822, Final Office Action, dated Mar. 10, 2015.
U.S. Appl. No. 14/314,822, Final Office Action, dated Oct. 8, 2015.
U.S. Appl. No. 14/314,822, Nonfinal Office Action, dated Dec. 10, 2014.
U.S. Appl. No. 14/314,822, Nonfinal Office Action, dated Jan. 12, 2017.
U.S. Appl. No. 14/314,822, Nonfinal Office Action, dated Jul. 7, 2015.
U.S. Appl. No. 14/788,998, Final Office Action, dated Apr. 18, 2016.
U.S. Appl. No. 14/788,998, Final Office Action, dated Jun. 14, 2017.
U.S. Appl. No. 14/788,998, Nonfinal Office Action, dated Dec. 4, 2015.
U.S. Appl. No. 14/788,998, Nonfinal Office Action, dated Feb. 10, 2017.
U.S. Appl. No. 14/795,369, Final Office Action, dated Apr. 20, 2016.
U.S. Appl. No. 14/795,369, Final Office Action, dated Aug. 22, 2017.
U.S. Appl. No. 14/795,369, Nonfinal Office Action, dated Dec. 8, 2015.
U.S. Appl. No. 14/795,369, Nonfinal Office Action, dated Feb. 7, 2017.
U.S. Appl. No. 14/862,703, Nonfinal Office Action, dated Dec. 10, 2015.
U.S. Appl. No. 14/862,703, Notice of Allowance, dated Apr. 13, 2016.
U.S. Appl. No. 15/674,067, "Systems and Methods for Generating Vehicle Insurance Policy Data Based on Empirical Vehicle Related Data", Hayward et al., filed Aug. 10, 2017.

* cited by examiner

Odometer Reading — 204
[          ]  [Browse...]

Engine Sound — 206
[          ]  [Browse...]

Vehicle Info — 208

| | |
|---|---|
| Make | [     ] — 208A |
| Year | [     ] — 208B |
| VIN | [     ] — 208C |
| Owner or Operators Age | [     ] — 208D |
| Owner or Operators Gender | [     ] — 208E |
| Owner or Operators Marital Status | [     ] — 208F |
| Owner or Operators Home Address | [     ] — 208G |
| How Vehicle is Used | [     ] — 208H |
| Where Vehicle is Driven to | [     ] — 208I |
| Miles Driven | [     ] — 208J |
| Number of Speeding Tickets | [     ] — 208K |
| Number of Auto Accidents | [     ] — 208L |
| Number of Claims Filed | [     ] — 208M |

[Submit] — 210

VEHICLE IMAGE AND SOUND DATA GATHERING FOR INSURANCE RATING PURPOSES

CROSS-REFERENCE TO RELATED APPLICATIONS

This application is a continuation of U.S. application Ser. No. 14/203,344, filed Mar. 10, 2014, which claims the benefit of U.S. Provisional Application No. 61/775,652, filed Mar. 10, 2013; both of which are hereby incorporated by reference in their entirety.

TECHNICAL FIELD

The present application relates generally to insurance and, more specifically, to systems and methods for collecting and processing vehicle image and sound data for insurance rating or underwriting purposes.

BACKGROUND

In vehicle insurance, insurance providers generally seek to determine an insurance policy premium for a vehicle based on the risk of losses associated with the condition of the vehicle. For purposes of making this determination, it is well understood that various vehicle conditions can influence the probability that the vehicle will experience a loss that is recognizable under the policy. For example, mileage accrued on the vehicle can affect the overall operating condition of the vehicle. As such, vehicles with less mileage or that are driven less generally have a lower risk of loss, and therefore may be offered lower premiums for a given level of coverage. Conversely, vehicles with high mileage or that are driven often correspond to a higher risk of loss, and therefore may be offered higher premiums for the same level of coverage.

Currently, insurance providers have limited or inadequate access to information regarding vehicle condition. Most of the information is gathered through questionnaires provided to prospective policy holders who own or operate the vehicle. However, responses obtained from the questionnaires may not always be accurate or complete. Thus, the determined insurance policy premium for the vehicle may be poorly correlated with the actual risk of losses associated with the conditions of the vehicle.

SUMMARY

The features and advantages described in this summary and the following detailed description are not all-inclusive. Many additional features and advantages will be apparent to one of ordinary skill in the art in view of the drawings, specification, and claims hereof. Additionally, other embodiments may omit one or more (or all) of the features and advantages described in this summary.

A computer-implemented method for providing vehicle insurance may include receiving, via one or more processors, data associated with a vehicle. The data may be captured by a sensor of a computing device and includes image data recorded by a photo sensor of the computing device and sound data recorded by an audio sensor of the computing device. The method may also compare, via one or more processors, the received data to stored baseline vehicle data to determine an operating condition of the vehicle, the stored baseline vehicle data including a baseline vehicle image or baseline engine sound model. Further, the method may identify, via one or more processors, a risk of loss for the vehicle based on the determined operating condition of the vehicle, where the risk of loss includes the image data deviating from the baseline image by a threshold amount or the sound data recorded by the audio sensor of the computing device deviating from the baseline engine sound model by a threshold amount. The method may then determine, via one or more processors, an insurance premium for the vehicle based at least in part on the identified risk of loss. Finally, the method may provide, via one or more processors, the determined insurance premium to a user.

A non-transitory computer-readable storage medium including computer-readable instructions to be executed on one or more processors of a system for providing vehicle insurance. The instructions when executed causing the one or more processors to receive data associated with a vehicle. The data may be captured by a sensor of a computing device. The instructions when executed, may also cause the one or more processors to compare the received data to stored baseline vehicle data to determine an operating condition of the vehicle. Further, the instructions when executed, may cause the one or more processors to identify a risk of loss for the vehicle based on the determined operating condition of the vehicle. The instructions when executed, may then cause the one or more processors to determine an insurance premium for the vehicle based at least in part on the identified risk of loss. Finally, the instructions when executed, may cause the one or more processors to provide the determined insurance premium to a user.

A computer system for providing vehicle insurance may comprise a vehicle data repository and an insurance server that includes a memory having instructions for execution on one or more processors. The instructions when executed by the one or more processors, may cause the insurance server to retrieve, via a network connection, sound data associated with a vehicle from the vehicle data repository. The instructions when executed by the one or more processors, may also retrieve, via a network connection, baseline engine sound model data from the vehicle data repository. Further, the instructions when executed by the one or more processors, may compare the sound data associated with the vehicle with the baseline engine sound model to determine an operating condition of the vehicle. The instructions when executed by the one or more processors, may identify a risk of loss for the vehicle based on the determined operating condition of the vehicle, wherein the risk of loss includes the sound data recorded by the audio sensor of the computing device deviating from the baseline engine sound model by a threshold amount. The instructions when executed by the one or more processors, may then determine an insurance premium for the vehicle based at least in part on the identified risk of loss. Finally, the instructions when executed by the one or more processors, may provide, via a network connection, the determined insurance premium to a user.

BRIEF DESCRIPTION OF THE DRAWINGS

FIG. 2 is a screenshot of an example user interface for providing insurance ratings based on vehicle image and sound data.

The figures depict a preferred embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Generally speaking, the disclosed system collects and analyzes image and sound data associated with the conditions of a vehicle in order to provide a policy holder with vehicle insurance ratings. As described herein, the conditions of the vehicle may correspond to the vehicle mileage, engine sounds, appearance, etc.

Figure 1:
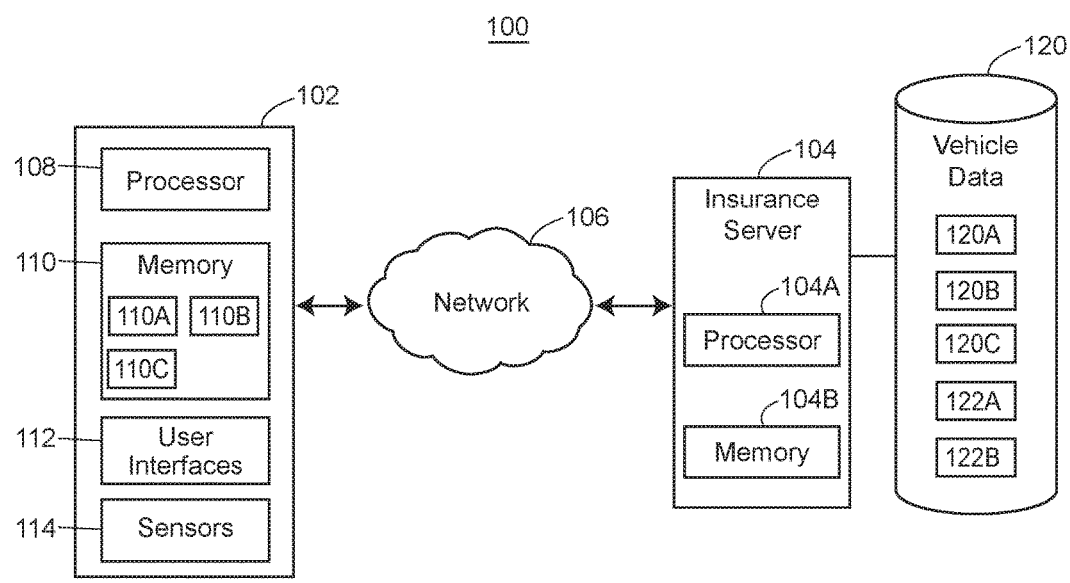
FIG. 1 is a block diagram of an example system for providing insurance ratings based on vehicle image and sound data.

FIG. 1 is a block diagram of an example system 100 for providing insurance ratings based on vehicle image and sound data. The example system 100 includes a computing device 102 that is communicatively coupled to an insurance server 104 via a network 106 (e.g., a local area network, a wide area network, a mobile network, a wired or wireless network, a private network, etc.). The computing device 102 may include a processor 108, a memory 110, user interfaces 112 (e.g., a display screen, a touchscreen, a keyboard, an analog control panel, etc.), and one or more sensors 114. In general, the computing device 102 may be a smart phone, a personal digital assistant (PDA), a laptop computer, a tablet computer, a smart watch, smart glasses, etc.

Generally, a policy holder (e.g., a current or potential policy holder) may operate the one or more sensors 114 on the computing device 102 to collect or capture image and sound data associated with the conditions of the vehicle. For example, the one or more sensors 114 may include an imaging sensor (e.g., a camera, a video recorder, etc.) that the policy holder may operate to capture images and/or videos of the vehicle. As another example, the one or more sensors 114 may include an audio sensor (e.g., a microphone) that the policy holder may operate to record sounds related to the vehicle such as engine sounds while the vehicle is running.

Once image and sound data associated with the conditions of the vehicle is collected or captured by the one or more sensors 114, the processor 108 may cause the data to be stored in the memory 110 before being transmitted to the insurance server 104 via the network 106. As such, the memory 110 may store captured images and/or videos as vehicle image data 110A, and recorded sounds as vehicle sound data 110B.

Additionally, the memory 110 may store vehicle owner or operator data 110C related to the owner or operators of the vehicle (e.g., the policy holder). For example, the owner or operators may input personal information (e.g., age, gender, home address, previous insurance claims, etc.) via, for example, the user interface 112. The processor 108 may then cause the personal information to be stored as the vehicle owner or operator data 110C in the memory 110. In some embodiments, the processor 108 may cause the gathered vehicle image data 110A, vehicle sound data 110B, and vehicle owner or operator data 110C to be transmitted directly to the insurance server 104 via the network 106.

In some embodiments, some or all of the vehicle image data 110A, vehicle sound data 110B, and vehicle owner or operator data 110C may be sent to the insurance server 104 via a third party. For example, a server of a vehicle data provider (not shown in FIG. 1) may first store and then transmit the vehicle image data 110A, vehicle sound data 110B, and vehicle owner or operator data 110C to the insurance server 104 via the network 106 or a different network.

With continued reference to FIG. 1, the insurance server 104 may be a single server or a plurality of servers with distributed processing. The insurance server 104 may be coupled to a vehicle data repository 120. In an embodiment, the insurance server 104 may receive the data 110A-110C stored in the memory 110 via the network 106. The received data 110A-110C may be stored in the vehicle data repository 120 as vehicle image data 120A, vehicle sound data 120B, and vehicle owner or operator data 120C. The vehicle data repository 120 may also include one or more vehicle condition models 122A and vehicle owner or operator statistics 122B that the insurance server 104 may use to correlate with the data 120A-120C in order to determine the likelihood of incurring recognizable losses for the vehicle. In some embodiments, the data 120A, 120B, 120C, 122A and/or 122B may be stored separately in different data repositories.

A processor 104A of the insurance server 104 may execute instructions stored in a memory 104B of the insurance server 104 to retrieve data stored in the vehicle data repository 120. The insurance server 104 may operate directly on the data 120A-120C provided in the vehicle data repository 120, or may operate on other data that is generated based on the data 120A-120C. For example, the insurance server 104 may convert any or all of the data 120A-120C to a particular format (e.g., for efficient storage), and later utilize the modified data. In some embodiments, the vehicle data repository 120 may not be directly coupled to the insurance server 104, but instead may be accessible by the insurance server 104 via a network such as the network 106.

The insurance server 104 may be configured to provide insurance ratings for the vehicle based on image and sound data associated with the condition of the vehicle. To this end, the insurance server 104 may compare the data 120A-120C with the one or more vehicle condition models 122A and vehicle owner or operator statistics 122B or other data to determine a risk rating or a parameter corresponding to a risk rating. The sound data may also be used to identify the beginning and ending of a trip using the vehicle. For example, an audio device may listen for a particular engine sound for the vehicle (i.e., like an audio fingerprint for the vehicle) and the functions described herein may determine when a trip has started and then when the trip has ended. The vehicle footprint sound could also trigger collection of other usage-based data such as mile driven, speed, time of day, geographic location, etc., or to distinguish a trip in Vehicle A from a trip in Vehicle B. Some example embodiments and scenarios are described here for illustration purposes.

In an example embodiment, a condition of the vehicle may correspond to the vehicle mileage. For example, the vehicle image data 120A in the repository 120 may specify odometer reading information. As such, the insurance server 104 may compare the odometer information in the data 120A to a vehicle odometer model (e.g., stored as one of the vehicle condition models 122) in the repository 120. The vehicle odometer model may identify one or more ranges of vehicle mileage, where each range corresponds to an indicator of loss likelihood. Thus, the insurance server 104 may determine a risk indicator by matching the odometer information in the data 120A to one of the vehicle mileage ranges in the vehicle odometer model. The insurance server 104 may then determine an insurance premium for the vehicle based at least in part on the determined risk indicator.

In another example embodiment, a condition of the vehicle may correspond to the vehicle engine sound. For example, the vehicle sound data 120B in the repository 120 may specify engine sound information. As such, the insurance server 104 may compare the engine sound information in the data 120B to a baseline engine sound model (e.g., stored as one of the vehicle condition models 122) in the repository 120. The baseline engine sound model may indicate that certain engine sounds correspond to particular operating conditions or states of the vehicle that can lead to a high-risk of loss, such as states of disrepair or indications of inappropriate or illegal modifications to the vehicle engine, when the sound data recorded by the audio sensor of the computing device deviates from the baseline engine sound model by a threshold amount. For example, where an exhaust note of a normally operating vehicle at idle may include a frequency of 600 Hz, the recorded sound data may indicate a low frequency of 300 Hz or a high frequency of 1000 Hz. Either the low or the high frequency may indicate disrepair or other engine states that correspond to a high-risk of loss. Thus, by comparing the engine sound information in the data 120B to the baseline engine sound model, the insurance server 104 may determine an appropriate risk of loss. Based at least in part on the identified risk of loss, the insurance server 104 may then determine an appropriate insurance premium for the vehicle.

In some embodiments, the insurance server 104 may use other conditions of the vehicle (e.g., paint conditions, tire conditions, window conditions, interior conditions, dents, scratches, or other vehicle defects) for vehicle insurance rating purposes.

Further, the insurance server 104 may utilize the vehicle owner or operator data 120C to provide insurance ratings for the vehicle. In an example embodiment, the vehicle owner or operator data 120C may specify information such as the age, gender, and marital status of the vehicle owner or operator, the home address or the neighborhood that the vehicle owner or operator resides, how the vehicle is used, how far the vehicle owner or operator drives every day and where the vehicle is driven to, how many miles driven per day, week, month, etc., how many speeding tickets the vehicle owner or operator has, how many accidents the vehicle owner or operator has been involved in, how many vehicle insurance claims that the vehicle owner or operator has filed, and other relevant information. The insurance server 104 may compare any or all of the information in the data 120C to the vehicle owner or operator statistics 122B in the repository 120. For example, the vehicle owner or operator statistics 122B may indicate a high risk of loss for the vehicle if the vehicle owner or operator lives in a dangerous neighborhood. In another example, the vehicle owner or operator statistics 122B may indicate a higher risk of loss for the vehicle if the vehicle owner or operator has been given speed tickets or has been involved in accidents in the past. Conversely, the vehicle owner or operator statistics 122B may indicate a lower risk of loss if the vehicle owner or operator has a clean driving record. Thus, by comparing the information in the data 120C to the vehicle owner or operator statistics 122B, the insurance server 104 may further refine or modify the risk of loss associated with the vehicle in order to provide more accurate vehicle insurance ratings.

It is understood that the above examples are not exclusive, and that more than one such embodiment may coexist within a single system.

Moreover, the insurance server 104 may be configured to provide renewals, updates, and/or adjustments of an existing insurance premium. To do so, the insurance server 104 may perform an audit, where the policy holder submits new or updated information (e.g., new image and sound data) regarding the conditions of the vehicle and/or the owner or operators of the vehicle. Using the new or updated information, the insurance server 104 may calculate a new or updated risk rating to determine or update the existing insurance premium.

In an example embodiment, the insurance server 104 may determine an insurance premium for a vehicle based at least in part on a mileage estimation provided by the policy holder. The mileage estimation may specify that the policy holder will only accrue a certain amount of mileage on the vehicle over a certain period of time covered by the insurance premium. At renewal time, the insurance server 104 may audit the policy holder to determine the actual mileage accrued on the vehicle. If the actual mileage is within the mileage estimation, then the insurance server 104 may renew the existing insurance premium for the vehicle. However, if the actual mileage is much greater than the mileage estimation, then the insurance server 104 may calculate a new risk rating and determine a new insurance premium for the vehicle.

In some embodiments, the policy holder may be requested to use a link to connect with a professional agent to perform the auditing process. For example, using a video chat service, the professional agent may perform inspect the vehicle and submit information regarding the conditions of the vehicle to the insurance server 104.

FIG. 2 is a screenshot of an example user interface 200 for providing insurance ratings based on vehicle image and sound data. In FIG. 2, the user interface 200 is shown in a computing device (e.g., a smart phone) such as the computing device 102 of FIG. 1. As such, the user interface 200 may be stored in the memory 110 and executed by the processor 108. When executed by the processor 108, the user interface 200 may be displayed to a policy holder via the user interfaces 112 (e.g., a display screen) of the computing device 102.

In the embodiment of FIG. 2, the user interface 200 may include an odometer reading input field 204 and an engine sound input field 206, which allow the policy holder to enter odometer reading information and engine sound information, respectively. For example, the policy holder may take an image and/or a video of the current vehicle mileage as shown in the vehicle odometer by using an imaging sensor (e.g., a camera or video recorder that is part of the one or more sensors 114) on the computing device 102. The captured image and/or video may be stored in the memory 110 of the computing device 102 as the vehicle image data 110A. The policy holder may then access and select the vehicle image data 110A in the memory 110 via the input field 204. The policy holder may also record the sound of the vehicle engine while the vehicle is running by using an audio sensor (e.g., a microphone that is part of the one or more sensors 114) on the computing device 102. The recorded engine sound may be stored in the memory 110 of the computing device 102 as the vehicle sound data 110B. Accordingly, the policy holder may access and select the vehicle sound data 110B in the memory 110 via the input field 206.

In addition, the user interface 200 may include a vehicle information input field 208, which allows the policy holder to enter information about the vehicle as well as the owner or operators of the vehicle (which may be the policy holder himself or herself). In the embodiment of FIG. 2, the input field 208 includes entries for a vehicle make 208A, a vehicle year 208B, a vehicle identification number (VIN) 208C, a vehicle owner or operator age 208D, a vehicle owner or operator gender 208E, a vehicle owner or operator marital status 208F, a vehicle owner or operator home address 208G, how the vehicle is used by the vehicle owner or operator 208H, where the vehicle is commonly driven to by the vehicle owner or operator 208I, an amount of miles driven by the vehicle owner or operator 208J, a number of speeding tickets that the vehicle owner or operator has 208K, a number of auto accidents that the vehicle owner or operator has been involved in 208L, and a number of vehicle insurance claims that the vehicle owner or operator has previously filed 208M. Information entered into the input field 208 may be stored in the memory 110 as the vehicle owner or operator data 110C, for example. Although FIG. 2 shows the entries 208A-208M in the vehicle information input field 208, in general, the input field 208 may include any number of entries that provide relevant information about the vehicle and/or the vehicle owner or operator.

Once the policy holder has entered or selected all the necessary information in the input fields 204, 206 and 208, the policy holder may execute the button 210 to submit the information to the insurance server 104. For example, the computing device 102 may transmit the information to the insurance server 104 for storage and processing via a network connection such as the network 106.

Figure 3:
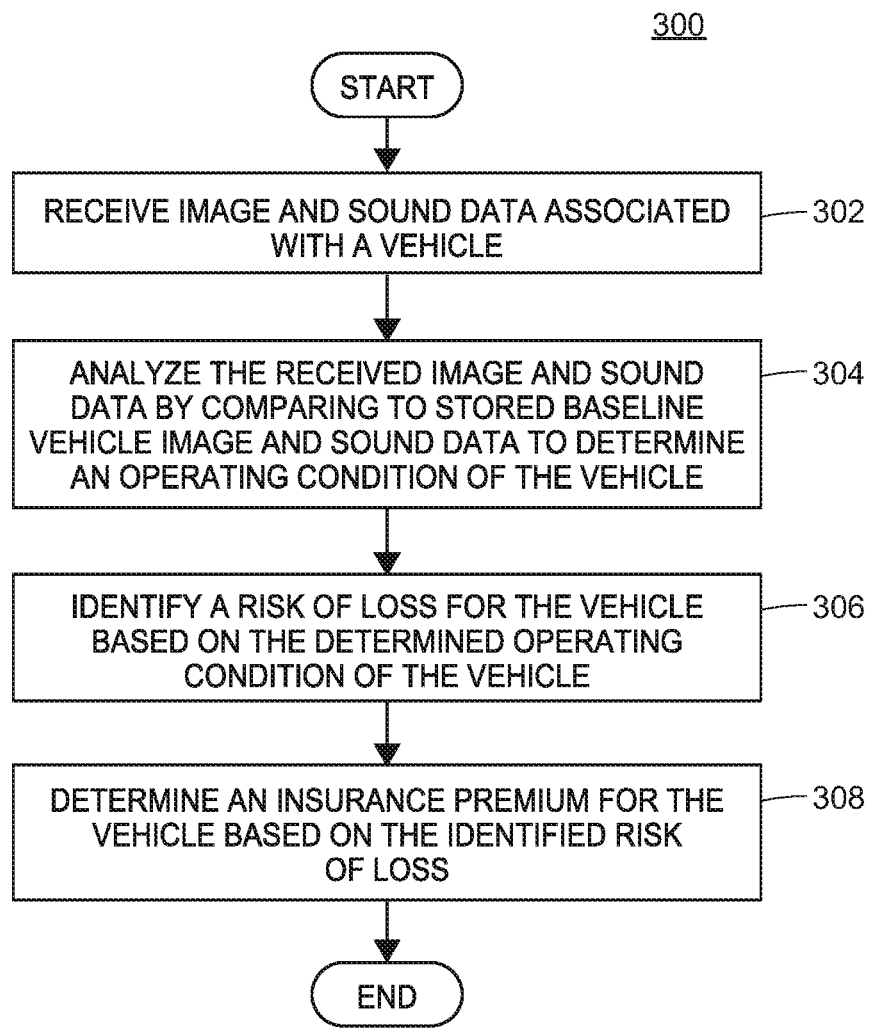
FIG. 3 is a flow diagram of an example method for providing insurance ratings based on vehicle image and sound data.

Referring now to FIG. 3, which describes a flow diagram of an example method 300 for providing insurance ratings based on vehicle image and sound data. The method 300 may include one or more blocks, routines or functions in the form of computer executable instructions that are stored in a tangible computer-readable medium (e.g., 104B of FIG. 1) and executed using a processor (e.g., 104A of FIG. 1).

The method 300 begins by receiving image and sound data associated with a vehicle (block 302). For example, the method 300 may receive a captured image and/or a video of the vehicle odometer reading as the image data, and a recorded sound of the vehicle engine as the sound data.

Next, the method 300 analyzes the received image and sound data by comparing the received image and sound data to stored baseline vehicle data in order to determine an operating condition of the vehicle (block 304). For example, the method 300 may compare mileage information in the odometer reading (as received in the image data or as entered into the user interface 200) to a set of mileage ranges that are part of the stored baseline vehicle data. From the comparison, the method 300 may determine how well the vehicle can operate given the mileage that is already accrued on the vehicle. Block 304 may also analyze the sound data to identify the beginning and ending of a trip using the vehicle. Block 304 may also trigger collection of other usage-based data such as mile driven, speed, time of day, geographic location, etc.

The method 300 then identifies a risk of loss for the vehicle based at least in part on the determined operating condition of the vehicle (block 306). Continuing with the above example, the method 300 may determine in the block 304 that the vehicle has a high mileage. Accordingly, the method 300 may identify a high risk of loss associated with the vehicle.

Finally, the method 300 may determine an insurance premium (or provide an indication of the determined insurance premium) for the vehicle based at least in part on the identified risk of loss (block 308). The method 300 may provide (e.g., display or communicate) the insurance premium to a policy holder via a display screen (e.g., the user interfaces 112 of FIG. 1), for example.

In some embodiments, the method 300 may include additional functionalities not shown in FIG. 3. For example, in addition to image and sound data, the method 300 may receive data regarding the owner or operators of the vehicle in the block 302. The method 300 may also analyze the received data regarding the owner or operators of the vehicle in the block 304. In particular, the method 300 may perform this analysis by comparing the data regarding the owner or operators of the vehicle to stored vehicle owner or operator statistics in the block 304, for example. Further, based at least in part on the analysis in the block 304, the method 300 may further develop or refine the identified risk of loss in the block 306.

In some embodiments, the method 300 may include additional blocks not shown in FIG. 3. For example, the method 300 may include blocks that provide renewals, updates, and/or adjustments of the determined insurance premium in the block 308. In an example embodiment, the method 300 may receive new or updated data (e.g., new image and sound data) associated with the vehicle, and calculate a new or updated risk of loss in order to update or modify the insurance premium determined in the block 308.

Using the system (e.g., 100), user interface (e.g., 200), and method (e.g., 300) described herein, a system may be implemented for providing insurance ratings based on vehicle image and sound data.

Figure 4:
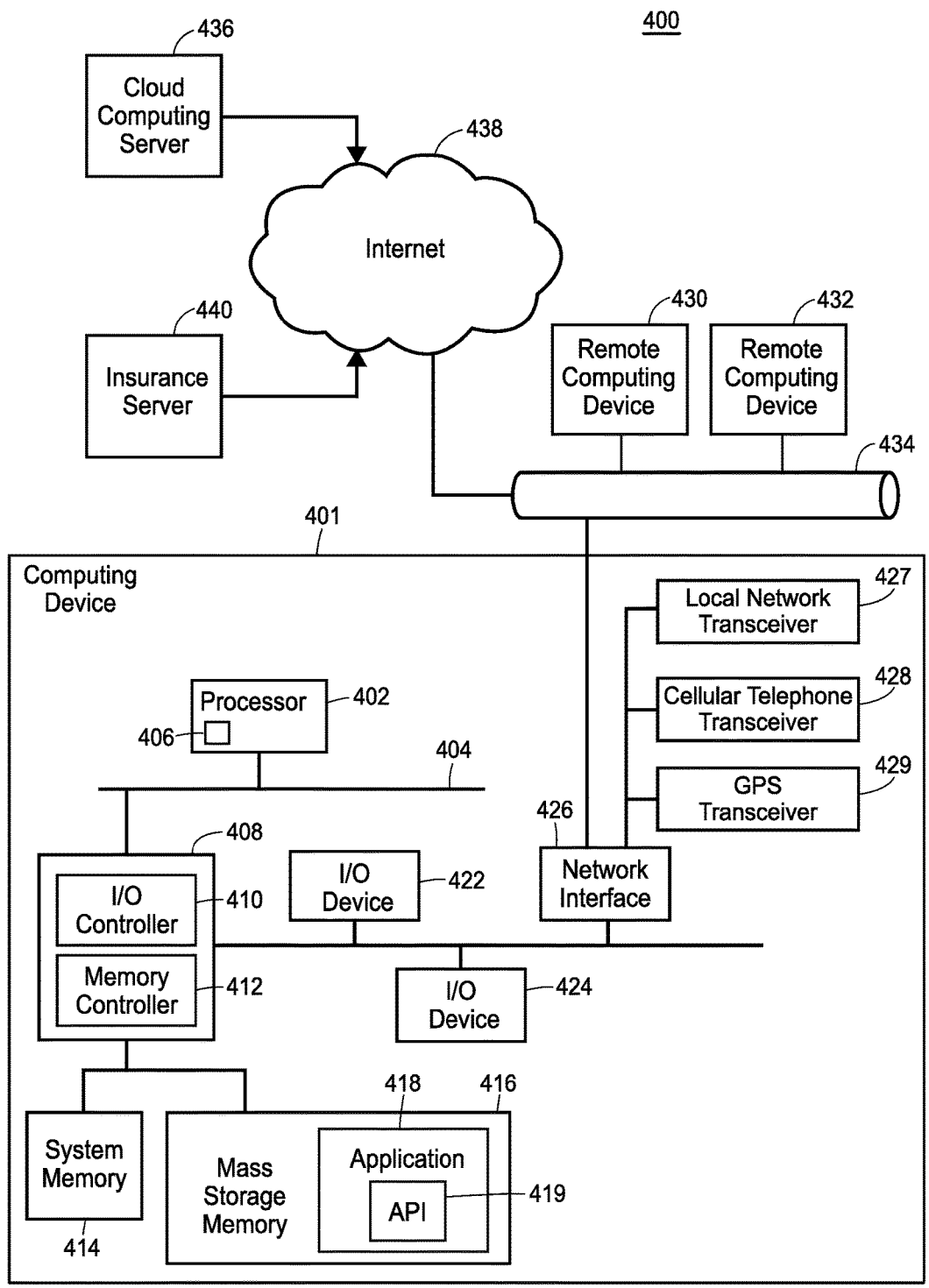
FIG. 4 is a block diagram of a computing environment that implements a system and method for providing insurance ratings based on vehicle image and sound data.

FIG. 4 is a block diagram of an example computing environment for a system 400 having a computing device 401 that may be used to implement the systems and methods described herein. The computing device 401 may include a computing device 102, an insurance server 104, a mobile computing device (e.g., cellular phone, a tablet computer, a Wi-Fi-enabled device or other personal computing device capable of wireless or wired communication), a thin client, or other known type of computing device. As will be recognized by one skilled in the art, in light of the disclosure and teachings herein, other types of computing devices can be used that have different architectures. Processor systems similar or identical to the example system 400 may be used to implement and execute the example system of FIG. 1, the user interface of FIG. 2, the method of FIG. 3, and the like. Although the example system 400 is described below as including a plurality of peripherals, interfaces, chips, memories, etc., one or more of those elements may be omitted from other example processor systems used to implement and execute the example system 100. Also, other components may be added.

As shown in FIG. 4, the computing device 401 includes a processor 402 that is coupled to an interconnection bus 404. The processor 402 includes a register set or register space 406, which is depicted in FIG. 4 as being entirely on-chip, but which could alternatively be located entirely or partially off-chip and directly coupled to the processor 402 via dedicated electrical connections and/or via the interconnection bus 404. The processor 402 may be any suitable processor, processing unit or microprocessor. Although not shown in FIG. 4, the computing device 401 may be a multi-processor device and, thus, may include one or more additional processors that are identical or similar to the processor 402 and that are communicatively coupled to the interconnection bus 404.

The processor 402 of FIG. 4 is coupled to a chipset 408, which includes a memory controller 410 and a peripheral input/output (I/O) controller 412. As is well known, a chipset typically provides I/O and memory management functions as well as a plurality of general purpose and/or special purpose registers, timers, etc. that are accessible or used by one or more processors coupled to the chipset 408. The memory controller 410 performs functions that enable the processor 402 (or processors if there are multiple processors) to access a system memory 414 and a mass storage memory 416, that may include either or both of an in-memory cache (e.g., a cache within the memory 414) or an on-disk cache (e.g., a cache within the mass storage memory 416).

The system memory 414 may include any desired type of volatile and/or non-volatile memory such as, for example, static random access memory (SRAM), dynamic random access memory (DRAM), flash memory, read-only memory (ROM), etc. The mass storage memory 416 may include any desired type of mass storage device. For example, if the computing device 401 is used to implement an application 418 having an API 419 (including functions and instructions as described by the method 300 of FIG. 3). The mass storage memory 416 may include a hard disk drive, an optical drive, a tape storage device, a solid-state memory (e.g., a flash memory, a RAM memory, etc.), a magnetic memory (e.g., a hard drive), or any other memory suitable for mass storage. As used herein, the terms module, block, function, operation, procedure, routine, step, and method refer to tangible computer program logic or tangible computer executable instructions that provide the specified functionality to the computing device 401 and the system 400. Thus, a module, block, function, operation, procedure, routine, step, and method can be implemented in hardware, firmware, and/or software. In one embodiment, program modules and routines (e.g., the application 418, the API 419, etc.) are stored in mass storage memory 416, loaded into system memory 414, and executed by a processor 402 or can be provided from computer program products that are stored in tangible computer-readable storage mediums (e.g., RAM, hard disk, optical/magnetic media, etc.).

The peripheral I/O controller 410 performs functions that enable the processor 402 to communicate with peripheral input/output (I/O) devices 422 and 424, a network interface 426, a local network transceiver 427, a cellular network transceiver 428, and a GPS transceiver 429 via the network interface 426. The I/O devices 422 and 424 may be any desired type of I/O device such as, for example, a keyboard, a display (e.g., a liquid crystal display (LCD), a cathode ray tube (CRT) display, etc.), a navigation device (e.g., a mouse, a trackball, a capacitive touch pad, a joystick, etc.), etc. The cellular telephone transceiver 428 may be resident with the local network transceiver 427. The local network transceiver 427 may include support for a Wi-Fi network, Bluetooth, Infrared, or other wireless data transmission protocols. In other embodiments, one element may simultaneously support each of the various wireless protocols employed by the computing device 401. For example, a software-defined radio may be able to support multiple protocols via downloadable instructions. In operation, the computing device 401 may be able to periodically poll for visible wireless network transmitters (both cellular and local network) on a periodic basis. Such polling may be possible even while normal wireless traffic is being supported on the computing device 401. The network interface 426 may be, for example, an Ethernet device, an asynchronous transfer mode (ATM) device, an 802.11 wireless interface device, a DSL modem, a cable modem, a cellular modem, etc., that enables the system 100 to communicate with another computer system having at least the elements described in relation to the system 100.

While the memory controller 412 and the I/O controller 410 are depicted in FIG. 4 as separate functional blocks within the chipset 408, the functions performed by these blocks may be integrated within a single integrated circuit or may be implemented using two or more separate integrated circuits. The system 400 may also implement the application 418 on remote computing devices 430 and 432. The remote computing devices 430 and 432 may communicate with the computing device 401 over an Ethernet link 434. For example, the computing device 401 may receive vehicle image and sound data created by an application executing on a remote computing device 430, 432. In some embodiments, the application 418 may be retrieved by the computing device 401 from a cloud computing server 436 via the Internet 438. When using the cloud computing server 436, the retrieved application 418 may be programmatically linked with the computing device 401. The application 418 may be a Java® applet executing within a Java® Virtual Machine (JVM) environment resident in the computing device 401 or the remote computing devices 430, 432. The application 418 may also be "plug-ins" adapted to execute in a web-browser located on the computing devices 401, 430, and 432. In some embodiments, the application 418 may communicate with a backend component 440 such as the insurance server 104 via the Internet 438.

The system 400 may include but is not limited to any combination of a LAN, a MAN, a WAN, a mobile, a wired or wireless network, a private network, or a virtual private network. Moreover, while only two remote computing devices 430 and 432 are illustrated in FIG. 4 to simplify and clarify the description, it is understood that any number of client computers are supported and can be in communication within the system 400.

Additionally, certain embodiments are described herein as including logic or a number of components, modules, or mechanisms. Modules may constitute either software modules (e.g., code or instructions embodied on a machine-readable medium or in a transmission signal, wherein the code is executed by a processor) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "some embodiments" or "an embodiment" means that a particular element, feature, structure, or characteristic described in connection with the embodiment is included in at least one embodiment. The appearances of the phrase "in some embodiments" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Further, the figures depict preferred embodiments of a system for providing insurance ratings based on vehicle image and sound data for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for a system and a process for providing insurance ratings based on vehicle image and sound data through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

We claim:

1. A computer-implemented method for providing vehicle insurance, the method comprising:
   receiving, by one or more processors executing a processor-implemented instruction module, data associated with a vehicle captured by a sensor of a computing device, wherein the data includes sound data produced by the vehicle and captured by an audio sensor of the computing device, the sound data having a particular frequency;
   analyzing, by the processor-implemented instruction module, the received data to determine an operating condition of the vehicle, wherein determining the operating condition of the vehicle includes comparing the particular frequency of the sound data captured by the audio sensor to a baseline frequency of a baseline engine sound model;
   determining, by the processor-implemented instruction module, a deviation between the particular frequency of the sound data and the baseline frequency of the baseline engine sound model;
   identifying, by the processor-implemented instruction module, a beginning or ending of a trip using the vehicle based at least in part on the sound data captured by the audio sensor of the computing device, wherein the beginning of the trip causes collection of vehicle usage data;
   calculating, by the processor-implemented instruction module, a risk of loss for the vehicle based upon the deviation and the collected vehicle usage data; and
   determining, by the processor-implemented instruction module, an insurance rating for the vehicle based at least in part on the calculated risk of loss and
   providing by the processor-implemented instruction module, the determined insurance rating to a user.

2. The computer-implemented method of claim 1, wherein the received data further includes image data captured by an imaging sensor of the computing device.

3. The computer-implemented method of claim 2, wherein the imaging sensor includes one or more of a camera or a video recorder, and the audio sensor includes a microphone.

4. The computer-implemented method of claim 3, wherein the image data includes a captured odometer reading indicating a mileage of the vehicle and the sound data includes a recorded engine sound while the vehicle is running.

5. The computer-implemented method of claim 4, wherein the image data further includes a captured image of the vehicle indicating an appearance of the vehicle including a vehicle make, a vehicle model, a vehicle model year, paint conditions of the vehicle, tire conditions of the vehicle, window conditions of the vehicle, interior conditions of the vehicle, dents on the vehicle, scratches on the vehicle, or other vehicle defects.

6. The computer-implemented method of claim 1, further comprising receiving, by the processor-implemented instruction module, vehicle owner or operator data associated with an owner or operator of the vehicle, and identifying the risk of loss for the vehicle is further based on comparing the received vehicle owner or operator data to stored vehicle owner or operator statistics.

7. The computer-implemented method of claim 6, wherein the vehicle owner or operator data includes one or more of an age, gender, or marital status of the vehicle owner or operator, a home address of the vehicle owner or operator, how the vehicle is used by the vehicle owner or operator, where the vehicle is driven to by the vehicle owner or operator, how many miles driven by the vehicle owner or operator, how many speeding tickets that the vehicle owner or operator has, how many auto accidents that the vehicle owner or operator has been involved in, or how many previous vehicle insurance claims that the vehicle owner or operator has previously filed.

8. The computer-implemented method of claim 2, further comprising:
   receiving, by the processor-implemented instruction module, updated image data, sound data or vehicle owner or operator data associated with the vehicle; and
   calculating, by the processor-implemented instruction module, an adjustment for the determined insurance rating based on the updated image data, sound data or vehicle owner or operator data.

9. A non-transitory computer-readable storage medium including computer-readable instructions to be executed on one or more processors of a system for providing vehicle insurance, the instructions when executed causing the one or more processors to:
   receive, by a processor-implemented instruction module, data associated with a vehicle captured by a sensor of a computing device, wherein the data includes sound data produced by the vehicle and captured by an audio sensor of the computing device, the sound data having a particular frequency;
   analyze, by the processor-implemented instruction module, the received data to determine an operating condition of the vehicle, wherein determining the operating condition of the vehicle includes comparing the particular frequency of the sound data captured by the audio sensor to a baseline frequency of a baseline engine sound model;
   determine, by the processor-implemented instruction module, a deviation between the particular frequency of the sound data and the baseline frequency of the baseline engine sound model;
   identify, by the processor-implemented instruction module, a beginning or ending of a trip using the vehicle based at least in part on the sound data captured by the audio sensor of the computing device, wherein the beginning of the trip causes collection of vehicle usage data;
   calculate, by the processor-implemented instruction module, a risk of loss for the vehicle based upon the deviation and the collected vehicle usage data; and
   determine, by the processor-implemented instruction module, an insurance rating for the vehicle based at least in part on the calculated risk of loss and
   provide, by the processor-implemented instruction module, the determined insurance rating to a user.

10. The non-transitory computer-readable storage medium of claim 9, wherein the received data further includes image data captured by an imaging sensor of the computing device.

11. The non-transitory computer-readable storage medium of claim 10, wherein the imaging sensor includes one or more of a camera or a video recorder, and the audio sensor includes a microphone.

12. The non-transitory computer-readable storage medium of claim 11, wherein the image data includes a captured odometer reading indicating a mileage of the vehicle and the sound data includes a recorded engine sound while the vehicle is running.

13. The non-transitory computer-readable storage medium of claim 10, wherein the image data further includes a captured image of the vehicle indicating an appearance of the vehicle including a vehicle make, a vehicle model, a vehicle model year, paint conditions of the vehicle, tire conditions of the vehicle, window conditions of the vehicle, interior conditions of the vehicle, dents on the vehicle, scratches on the vehicle, or other vehicle defects.

14. The non-transitory computer-readable storage medium of claim 9, further including instructions that, when executed, cause the one or more processors to receive, by the processor-implemented instruction module, vehicle owner or operator data associated with an owner or operator of the vehicle, and wherein the instructions to identify the risk of loss for the vehicle include identifying the risk of loss based on comparing the received vehicle owner or operator data to stored vehicle owner or operator statistics.

15. The non-transitory computer-readable storage medium of claim 14, wherein the vehicle owner or operator data includes one or more of an age, gender, or marital status of the vehicle owner or operator, a home address of the vehicle owner or operator, how the vehicle is used by the vehicle owner or operator, where the vehicle is driven to by the vehicle owner or operator, how many miles driven by the vehicle owner or operator, how many speeding tickets that the vehicle owner or operator has, how many auto accidents that the vehicle owner or operator has been involved in, how many previous vehicle insurance claims that the vehicle owner or operator has previously filed, or other relevant information.

16. The non-transitory computer-readable storage medium of claim 9, further including instructions that, when executed, cause the one or more processors to:
  receive, by the processor-implemented instruction module, updated image data, sound data or vehicle owner or operator data associated with the vehicle; and
  calculate, by the processor-implemented instruction module, an adjustment for the determined insurance rating based on the updated image data, sound data or vehicle owner or operator data.

17. A computer system for providing vehicle insurance, the system comprising:
  a vehicle data repository; and
  an insurance server, including a memory having instructions for execution on one or more processors, wherein the instructions, when executed by the one or more processors, cause the insurance server to:
    retrieve, via a network connection, sound data produced by a vehicle, the sound data having a particular frequency;
    retrieve, from the vehicle data repository, via a network connection, stored baseline vehicle data, wherein the stored baseline vehicle data comprises a baseline engine sound model having a baseline frequency;
    compare, by the one or more processors executing one or more processor-implemented instruction modules, the particular frequency of the sound data produced by the vehicle with the baseline frequency of the baseline engine sound model to determine an operating condition of the vehicle;
    determine, by the one or more processors executing one or more processor-implemented instruction modules, a deviation between the particular frequency of the sound data and the baseline frequency of the baseline engine sound model;
    identify, by the one or more processors executing one or more processor-implemented instruction modules, a beginning or ending of a trip using the vehicle based at least in part on the sound data produced by the vehicle, wherein the beginning of the trip causes collection of vehicle usage data;
    calculate, by the one or more processors executing one or more processor-implemented instruction modules, a risk of loss for the vehicle based upon the deviation and the collected vehicle usage data; and
    determine, by the one or more processors executing the one or more processor-implemented instruction modules, an insurance rating for the vehicle based at least in part on the calculated risk of loss and
    provide via a network connection, the determined insurance rating to a user.

18. The computer system of claim 17, wherein the instructions of the insurance server, when executed by the one or more processors, further cause the insurance server to:
  retrieve, via the network connection, vehicle owner or operator data associated with an owner or operator of the vehicle;
  retrieve, via the network connection, vehicle owner or operator statistics; and
  identify, by the one or more processors executing the one or more processor-implemented instruction modules, the risk of loss based on comparing the vehicle owner or operator data to the vehicle owner or operator statistics.

19. The computer system of claim 17, wherein the instructions of the insurance server, when executed by the one or more processors, further cause the insurance server to:
  retrieve, via the network connection, updated data including image data, updated sound data or vehicle owner or operator data associated with the vehicle from the vehicle data repository; and
  calculate, by the one or more processors executing the one or more processor-implemented instruction modules, an adjustment tar the determined insurance rating based on the image data, updated sound data or vehicle owner or operator data.

20. The computer system at claim 19, wherein the image data includes a captured odometer reading indicating a mileage of the vehicle, and the updated sound data includes a further recording of engine sound while the vehicle is running.

* * * * *